United States Patent
Morgan

(10) Patent No.: US 7,437,341 B2
(45) Date of Patent: Oct. 14, 2008

(54) SYSTEM AND METHOD FOR SELECTING A SUITABLE TECHNICAL ARCHITECTURE TO IMPLEMENT A PROPOSED SOLUTION

(75) Inventor: Robert E. Morgan, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 300 days.

(21) Appl. No.: 11/275,308

(22) Filed: Dec. 22, 2005

(65) Prior Publication Data
US 2007/0074148 A1 Mar. 29, 2007

Related U.S. Application Data

(60) Provisional application No. 60/695,376, filed on Jun. 29, 2005.

(51) Int. Cl.
*G06F 17/00* (2006.01)
*G06N 5/00* (2006.01)
(52) U.S. Cl. .............................. 706/47; 706/46; 706/45
(58) Field of Classification Search .................. 706/47, 706/46, 45; 717/117, 101
See application file for complete search history.

(56) References Cited

U.S. PATENT DOCUMENTS

| | | | |
|---|---|---|---|
| 7,149,734 B2 * | 12/2006 | Carlson et al. ................. | 707/6 |
| 2003/0167455 A1 * | 9/2003 | Iborra et al. ................. | 717/105 |
| 2004/0204972 A1 * | 10/2004 | Anant et al. .................... | 705/7 |
| 2004/0233232 A1 * | 11/2004 | Iborra et al. ................. | 345/700 |
| 2004/0243968 A1 * | 12/2004 | Hecksel ...................... | 717/100 |
| 2005/0015745 A1 * | 1/2005 | Wain et al. .................. | 717/105 |

* cited by examiner

*Primary Examiner*—Joseph P. Hirl
*Assistant Examiner*—Adrian L Kennedy
(74) *Attorney, Agent, or Firm*—Fitzpatrick, Cella, Harper & Scinto

(57) ABSTRACT

Systems, methods and computer program products for assisting a user who is designing a project in selecting a technical architecture suitable for the project. A catalog of architectures and architecture components and various criteria to be met by project architectures, including such as technical standards, organization policies and guidelines, and legal or regulatory ones, are stored. The catalog may be web-based. Questions are posed to the user about the nature of the project, and a rules engine guides the user through relevant portions of the catalog based on the user's answers to the questions, and a set of one or more architectures that would be suitable for the project is proposed to the user. Once the user selects an architecture, the rules engine leads the user through a review of the stored criteria applicable to the project, to identify any that are not met by the selected architecture.

24 Claims, 10 Drawing Sheets

SYSTEM AND METHOD FOR SELECTING A SUITABLE TECHNICAL ARCHITECTURE TO IMPLEMENT A PROPOSED SOLUTION

CROSS-REFERENCE TO RELATED APPLICATION

This application claims priority to, and the benefit of the filing date of, U.S. Provisional Patent Application No. 60/695,376, filed Jun. 29, 2005, the entire disclosure of which is hereby incorporated by reference.

BACKGROUND OF THE INVENTION

1. Field of the Invention

The present invention relates generally to assisting a software architect in the design of an architecture for a new application, product or service, and relates more particularly to ensuring that a new or proposed software application or software-based product or service for an organization complies with all legal and other externally-imposed requirements, as well as the organization's own policies and guidelines, and makes optimum use of the organization's accumulated institutional knowledge and experience.

2. Related Art

It is frequently necessary for an enterprise to create a new software application, either for purely internal use, or as part of a new product or service it wishes to offer to customers. Such an application might have to do with accounting, inventory control, or with storing and maintaining information about the enterprise's customers, or be a tool for use in performing analysis of some body of information, or an interactive website for use by customers. In many instances the new application will need to exchange information with existing programs that may be platformed on different operating systems. In addition, of course, the new application must meet the needs of its prospective users, whether they are customers, outside vendors, or the organization's own accounting personnel, financial analysts, marketing personnel, or others. In addition, there may often be external requirements besides customers' preferences that must be met, including in particular legal obligations such as providing adequate protection for sensitive, or merely private, customer information at the level mandated by applicable laws (which may involve meeting different requirements, imposed by the laws of several jurisdictions, in the case of an application that is intended to handle, e.g., information of customers residing in the United States, Canada and European Union member states).

In some cases, meeting all these disparate types of demands and constraints may be relatively simple, and particularly in a smaller organization, may be achievable simply by sufficient discussions and negotiations between the information technology (IT) department and others in the organization. In a large organization, however, such a project may be extremely complex, and a more organized, methodical approach may be required. This is both because the more complex the project, the more difficult it will be to ensure that all applicable requirements have been met, and because as the level of complexity increases, the time and cost of attaining that certainty can easily increase to the point that an otherwise reasonable project may become unfeasible.

Ordinarily, a great deal of the information necessary for ensuring that all applicable requirements are met is present within the organization itself, although in other cases, it may be necessary to obtain certain information from customers or vendors. Applicable legal requirements will be known to personnel in the legal department, and the accumulated experience of personnel in the IT department will be relevant to such matters as ensuring that an application can exchange information with existing ones, knowing what infrastructure is needed to maintain an application running reliably, and with a desired speed, and so forth. In addition, the organization likely has numerous policies that may affect what is acceptable or unacceptable in a proposed application, and this information also will be available within the organization. For a person or team tasked with creating the new application, however, gathering all relevant information from all these sources, and being certain that nothing relevant has been missed, is nearly certain to be a time-consuming and frustrating, although indispensable, part of the project.

In addition to the practical necessity of ensuring, at a feasible cost and in a reasonable time, that the new application will function as desired and will meet all specific government mandates, the onus has been mounting on companies to ensure good governance throughout their businesses. Today there is a growing focus on companies' internal oversight of their structures, operating practices and implementations, with a growing need for documented accountability and across-the-board compliance with preset, approved standards. (One need only consider the recent Sarbanes-Oxley legislation as evidence of this trend.) Consequently, it may not be enough for an organization actually to create a new application quickly and inexpensively while ensuring that it meets all applicable requirements, the organization also needs to be seen to be doing so by its shareholders and regulators.

There has been until now no systematic and automated means by which to verify and maintain a record of new project compliance with applicable laws, regulations, customer desires, vendor needs, and internal requirements absent labor-intensive manual review of each project.

Another problem that has existed is the adoption of inconsistent and non-standard infrastructure implementations, which are difficult and costly to build and support. The current problem in the industry from an infrastructure, architecture and development perspective is that those three areas are not connected in any meaningful way. This problem has existed for many years since organizations have been building complex computer architectures to solve business problems, and has only become more serious with the advent of distributed computing and the increase in the number of hardware and software components required to build an information system.

There exist a number of tools that may help a company to simplify the job of designing new software, or that otherwise help in streamlining a company's procedures, but none come close to solving the problem described above. For example, Microsoft® Corporation has a design tool that allows for the constructions of systems. It provides a single view of a possible partial implementation. Microsoft's design tool is described at http://msdn.microsoft.com/msdnmag/issues/04/07/Whitehorse/. This design tool, Visual Studio® 2005, is a suite of graphical tools for use in implementing service-oriented architecture ("SOA"). With this design tool, architects are able to bind services to servers and later validate that any resulting design will in fact run successfully in a datacenter. Architects can likewise provide technical descriptions of, for instance, communication between different types of program that meets specific constraints, including user-defined constraints. However, despite allowing a user to specify constraints of these sorts that need to be met, this design tool does not enable an organization to present legal, policy, and other types of requirements as a single catalog to in-house architects and outside vendors alike, to assist in ensuring that new proposed applications conform to applicable requirements.

IBM® and many other vendors are building tools to design better architectures with their products to a new style called SOA (Service Oriented Architecture).

Centrata® has marketed a tool which, although not used in architecture design, helps a company provide new employees with all needed equipment, paperwork, and the like, automatically. A newly hired employee requires a new desk, office or cubicle, telephone, computer workstation, the ability to enter at least certain portions of the worksite, and the like. Instead of all of these supplies, keys and authorizations being provided through different departments of the company, the Centrata product itself notifies the relevant departments or personnel of the actions they respectively need to take to provide the new employee with all that is needed.

Nonetheless, there is still no systematic method for determining how closely an architect's proposed application conforms to applicable requirements as discussed above, nor is there a cost-effective way to ensure the adoption of consistent architecture solutions throughout an organization.

Given the foregoing, what is needed is a system, method and computer program product for conforming proposed solutions to a predefined set of standardized parameters. Specifically, there exists a need to automate architecture design to ensure use, where feasible, of one of a company's pre-approved architectures, and to ensure in any event the compliance of new applications and implementations with all applicable requirements, without the need for a manual review of every aspect of the proposal.

BRIEF DESCRIPTION OF THE INVENTION

The present invention meets the above-identified needs by providing a system, method and computer program product for selecting a suitable technical architecture to implement a proposed solution.

In accordance with one embodiment of the present invention, there is provided a method for assisting a user who is designing a project in selecting a technical architecture suitable for the project that proceeds by storing a catalog of components and storing a set of requirements to be met by project architectures. The method further includes posing questions to the user about the project, each preferably being based on the user's previous responses. Then, based on the user's responses, there is proposed to the user at least one potential architecture for the project. The user accepts the proffered architecture, or selects one if several are proposed, and the architecture is reviewed vis-à-vis of the stored requirements. This is preferably done by guiding the user through a series of questions relating to the various requirements that are applicable to the type of architecture or to the type of project in question.

In accordance with another aspect of the present invention, the user is warned if the architecture selected fails in some way to meet one or more requirements. Optionally, an alert also is sent to the department in the organization that established the requirement in question. Alternatively, a score is awarded to the selected architecture during the review according to how many, and which, of the requirements it does not comply with, and an alert is sent to other personnel in the organization only if the score indicates a significant level of non-compliance.

In accordance with yet another aspect of the present invention, a permanent record is made of the user's selection of the architecture and of the review of that architecture.

An advantage of the present invention is that it conserves the time and resources of an organization by streamlining conventional review and oversight processes which are routinely conducted prior to authorizing and implementing any new application. By codifying preferred standards and practices so as to provide a preset series of approved architectures and requirements as components within a catalog, along with means for tracking and recording compliance therewith, the present invention obviates the need for a complete top-to-bottom review of a new proposal by an organization to determine whether all of its requirements have been satisfied. Thus, the personnel reviewing a new proposal will need only to focus on any non-standard proposals, and even in such case, the review can be limited to the non-standard aspect(s) of the complete solution.

Another advantage of the present invention is that it provides an automated and systematic means for presenting an organization's requirements and documenting and maintaining information on the approval of any non-standard implementation. The present invention therefore alleviates the burden of second-guessing the reasons why a particular application presenting potentially higher risk was authorized and provides a record of the personnel having granted authorization. The tracking and recordkeeping accomplished by the present invention further assists with possible future auditing and/or accountability by requiring precise governance and approval from any one of a number of departments or teams, for any non-standard implementation.

Another advantage of the present invention is that its automation and built-in expertise allows users to step through various scenarios of implementation and choose different options to see in real time what the possible implementations may be in regard to cost and development. In this way, the time of domain experts is freed up by not having to engage with project teams for determining possible difficulties with countless options.

Yet another advantage of the present invention is that it reduces an organization's overall risk by cutting down the number of authorized non-standard applications which are difficult and costly to build and support. The present invention eliminates the needless resource expenditure on already-compliant applications and instead channels the focus onto non-standard proposals, thereby placing the onus on a party advancing such alternatives to make a strong case as to how the increased risks are outweighed by the potential gains a company stands to make.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements, and in which, incidentally, the first digit of each reference numeral identifies the number of the drawing figure in which that numeral first occurs.

FIG. 1(*b*) is a system block diagram illustrating a reference architecture catalog system, linked to an online systems server that is connected to a network and maintained by an organization, in a variation of the embodiment of FIG. 1(a).

DETAILED DESCRIPTION

I. Overview

Figure 1A:
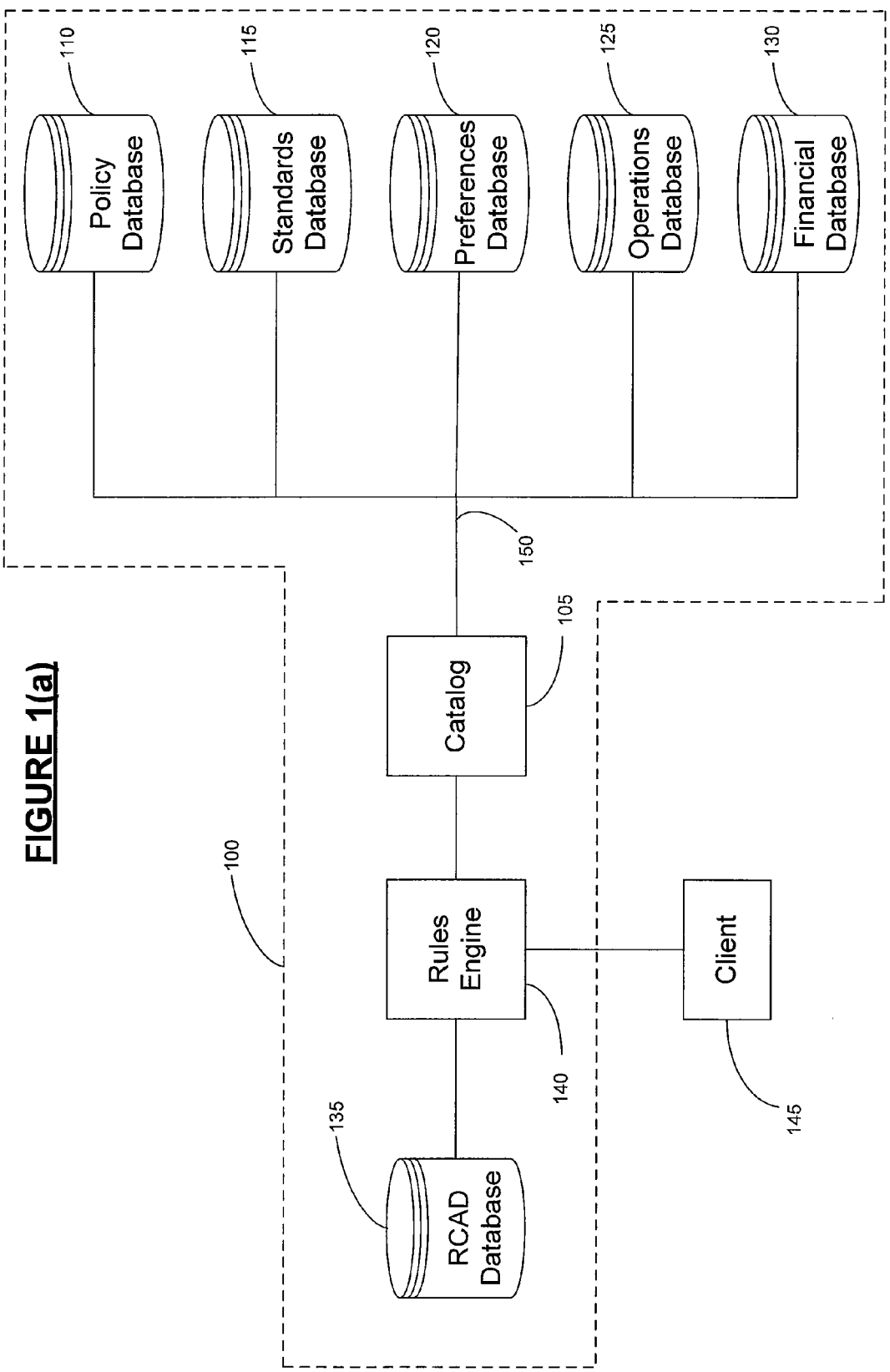
FIG. 1(*a*) is a system block diagram illustrating systematically and functionally a reference architecture catalog system maintained by an organization in accordance with one embodiment of the present invention.
FIG. 1(c) is a system block diagram illustrating a reference architecture catalog system linked to an online systems server, maintained by an organization and connected, over a network, to a separate server, maintained by an outside party, in a further variation of the embodiment of FIG. 1(a).

The present invention is described in more detail herein in terms of several exemplary implementations. This reference to specific implementations is for convenience only and is not intended to limit the application of the present invention.

Generally, the present invention is directed to a system, method and computer program product for facilitating the conforming of new proposals to a predetermined set of standardized parameters, such as an organization's security measures, cost restrictions, preferred technology, and policies, as well as legal and any other applicable requirements, in order to streamline the necessary oversight and authorization process for new applications, including websites and information systems.

The term "user" and the plural form of this term are used interchangeably throughout herein to refer to those persons or entities capable of accessing, using, being affected by and/or benefiting from the present invention. Also within the context of the present invention, the term "user" may be any person, group, company or entity that is an employee, contractor or altogether separate party from the organization, proposing some new solution or application of technology for use by the organization.

Furthermore, the terms "organization", "business", "company" and "merchant" may be used interchangeably with each other and shall mean any person, business or governmental entity, distributor system, software and/or hardware, for example (although not only), one that is a provider, broker and/or any other entity in the distribution chain of goods or services.

An "architecture", as the term is used herein, is a particular choice and arrangement of components in a software system, including the connections among them. The components may range from individual modules of code to larger elements such as stand-alone programs (e.g., operating systems or database or other applications). The connections essentially represent the ways in which the components interact.

Various departments within a given organization maintain respective collections of preferred methods, practices, technology, requirements and expertise that affect the suitability of any proposed new application. According to the invention, this knowledge is pooled in a central collection such as, for instance, a series of databases, and in this way is made available to a project team or outside vendor designing a new application, in a manner that leads to the identification of one or more architectures that are suitable for the project and that conform to applicable requirements. In addition, once one of those architectures is selected for the project, the system leads the user through a review of the selected architecture vis-à-vis of the requirements that apply to that project. This permits the project team or vendor to be sure that the proposal will be acceptable to the organization, or, if the selected architecture is not clearly an acceptable one, the subsequent manual review by organization management can focus on those specific requirements that do not appear to be met.

The present invention enables those various requirements, constraints, assumptions and decisions that embody the organization's requirements, preferences, and generally, its institutional knowledge relating to software systems (collectively, "RCAD", although the RCAD will also be referred to generically as "requirements") to be organized and stored in a database that is a part of the system of the present invention. A design team or other user of this system, guided by a series of questions determined by a rules engine, describes what the user wishes to accomplish, and is guided to a set of one or more architectures ("potential architectures") that will accomplish the user's stated intention. As described below, this process occurs by means of the user browsing through a catalog that both presents the questions that serve to inform the system of the user's goal, and also progressively identifies architectures or portions thereof that are consistent with that goal. Once the user has accepted the proffered potential architecture or accepted one of the set of potential architectures, the user is led by the rules engine through a series of further questions that serve as a review of this accepted architecture (the "project architecture") that is designed to identify any respects in which the organization's policies and guidelines are not clearly met by the selected project architecture. There is an evaluation of the user's responses according to the degree and seriousness of any deviation(s) from the RCAD and a subsequent referral of non-compliant project architectures for review by management personnel.

Specifically, a user navigates through series of levels of questions that result in the user defining what the new application is intended to do, its capacities and capabilities, what sorts of data (high-sensitivity, low-sensitivity, etc.) it will handle, and the like. Based on the responses of the user, the present invention hierarchically narrows the field of possible implementations according to the compatibility of the proposed application with the available architectures of the organization.

Once the user has selected a project architecture, the following series of questions guides the user through a review of the collected RCAD that the system has determined apply to the project in question. Each answer is compared to a standard, and is scored according to whether it matches the standard (desired) answer or not. Depending on the question, the answer may be given a score indicative of the degree to which the selected architecture conforms to the standard for that question. Also, in valuating the total score, which thus will be an indication of the degree to which the architecture conforms to the organization's requirements, the user's responses to various questions are weighted so that the responses to some questions count for more than do others.

By eliminating the need for manual management oversight of architectures that in fact adopt approaches that have been used previously and that the organization knows meet all applicable requirements, the present invention frees the resources of the organization to be focused on those proposals that adopt non-standard approaches and therefore warrant additional and careful manual review prior to approval.

Also, the present invention makes a permanent record of the questions asked and the answers given, and thus aids in promoting accountability and in auditing.

II. System

FIG. 1(a) is a functional system diagram of an exemplary embodiment of the present invention. That embodiment is a reference architecture catalog system 100, which processes and stores information relating to predefined standardized parameters. System 100 stores, as components, an inventory of hardware and software components, and of specific combinations of those components that the organization knows from experience satisfy applicable requirements for particular types of projects or for specific functions. Information stored relating to each element in the inventory may include such items as purchase or leasing cost, reliability, IT staff hours required to maintain the item in operation over a unit period of time, and any other information that the organization considers useful. Also present in system 100 is a collection of criteria to be met by project architectures including, but not limited to, policy requirements, standards, finance and operations considerations (explained in more detail below). Reference architecture catalog system 100 also comprises a catalog 105, which may be implemented as an Oracle® or other database running on a server configured to communicate with one or more client computers 145 via a network (e.g., a local area network (LAN)), or a mainframe computer configured to communicate with a number of terminals.

Catalog 105 is connected to several databases 110-130 over a network 150 as part of reference architecture catalog system 100. Network 150 likewise may be a LAN or any other conventional network that enables access of the information data stored within the respective databases from the catalog.

Among these databases are a policy database 100, a standards database 115, a preferences database 120, an operations database 125, and a financial database 130. As implemented, any of a variety of categories of approved architectures for a company is stored in the appropriate database, with a server processing the data among the several linked databases making up the catalog of parameters 105.

Policy database 110 stores an organization's highest-level priorities for any new application. This policy information is formulated by the top level of management and conveys what the essential components, principals and policies of a given architecture are. The information does not specify the precise means for effectuating such requirements. Examples of policies that might be stored in the policy database are that all customer information must be protected, or that all interactive websites intended for use by customers must be available 24/7 with 99.9% reliability.

Standards database 115 stores information on specific mechanisms for effectuating the policy requirements. For instance, when the specific policy is that all customer information must be protected, the standard for doing so may be that encryption of a specific type is used (e.g., a public key/ private key system with a specific number of bits in length).

It should be noted that a rule (e.g., encryption of certain data) might be a policy requirement in one organization, while another organization facing a similar concern might have a less-specific policy but specify encryption at the standards level as the preferred way to implement policy.

Importantly, the policy data and the standards data are separate pieces of information, stored in different databases, with each individual policy or standard being a respective XML file (while this approach is a convenient one, it should be understood that the invention is not limited to this form of file, or even to an arrangement in which all policies, standards, etc., are stored in the same format). Every stored policy and standard within the respective databases is individually numbered, and can be modified, or can be deleted when no longer in effect. Various departments and personnel within the organization play different roles in creating the contents of databases 110-130, so that, for instance, the executives establish a policy level requirement which is then programmed into policy database 110, while the technology department would define the possible technologies for implementing a given policy and supply this information to standards database 115.

Preferences database 120 stores information on best practices for implementing both the policies and the standards. One example of such a preference might be a precise algorithm preferred by the organization for use in encryption. If that algorithm has a public and private key that is either managed on a server or, alternately, remotely, the preferences relating to the encryption policy and standards may also specify that the keys used should expire within a certain period of time, as for example, after three months. Again, a style guide to be followed in creating or editing pages for the organization's website may also constitute preference data. Generally, while there may be several approved methods for implementing a particular standard, the preference data includes an identification of which (if any) is preferred. As will be appreciated, the various preferences originate from the personnel responsible for the relevant aspect of operation.

Operations database 125 stores policy and standards information of an outside vendor whom the organization has hired to perform some aspect of the organization's operations or applications. When, for example, an organization enters an agreement with an outside vendor to maintain certain of the organization's hardware and software, according to a specified schedule, the vendor's own policies and standards relating to that maintenance will be the operations data. If the contractual arrangement requires the vendor to maintain the servers running the organization's applications at, say, a 99.9% reliability level on a 24-hour basis, the policies, standards and preferences of the vendor that are relevant to the vendor's obligations to the organization, including perhaps the number of servers required, the number of CPUs, and the amount of memory and disk space required, would all constitute operations data stored in the operations database.

Financial database 130 stores cost information relating to the organization's policies and standards, and optionally, the cost information supplied by any outside vendor representing its expenses for maintaining a particular operation for the organization. This financial information may include, for example, the organization's own costs for supporting its operations, such as the price of a server, the energy costs for maintaining such server, and the like. This information would be supplied by the accounting personnel of the organization.

The financial data may also include cost information of an outside vendor. In situations when an organization contracts with a separate vendor to maintain some part of its application (s), that vendor will then have its own internal expenses associated with completing its contractual obligations. To illustrate, when a vendor performs a maintenance contract for the organization, the vendor may need to install additional servers to run the specific operation. In such case, the vendor may purchase or lease the necessary hardware from another supplier, and all of those additional costs would then be stored as financial data within the financial database.

The embodiment of FIG. 1(a) also includes a RCAD database 135, storing particular requirements, constraints, assumptions and decisions ("RCAD") relating to policy, standards, preferences, operations and finance data. These RCAD are a synthesis of the codified policies and expertise of the various departments and management in an organization. That is, each RCAD captures the institutional knowledge of what is to be done for a particular consideration. Each of the RCAD is a separate component of the complete catalog, and preferably has an associated weighting (e.g., point value) assigned to it. RCAD database 135 may be created manually from the information stored in databases 110-130, and updated as necessary when a change is made to the contents of any of these latter databases. Since much of the information in databases 110-130 may initially exist only in the form of, for example, MSWord® documents, human review of the contents of databases 110-130 and writing appropriate entries for RCAD database 135 may be the most efficient method. The particular method used to generate RCAD database 135 is not, however, critical to the invention.

Of course, the present invention is not limited to the specific aforementioned databases, and additional databases for storing wholly separate information may be provided as part of the reference architecture catalog system. Such additional databases may be stored as a single database or as physically or logically separate databases, as depicted in FIG. 1(a), and the physical storage device or devices used may be either internal or external to reference architecture catalog system 100.

There is also illustrated in FIG. 1(a) a rules engine 140 that drives the interaction of with system 100 with the user. Although depicted in FIG. 1(a) as a distinct element, this is merely to show the separate function of rules engine 140 and is not intended to limit the rules engine to being a separate operating unit. In fact, it is particularly contemplated that rules engine 140 is integrated with catalog 105.

Rules engine 140 serves to connect and process the components within catalog 105, and guides the user interactively through the catalog, as described below.

As noted above, client computer 145 is connected to reference architecture catalog system 100 to allow a user access to catalog 105. Client computer 145 may take the form of, for example, a personal computer, workstation, or other terminal from which data stored in system 100 may be retrieved and by means of which the user can input responses to questions posed to the user by system 100.

Figure 1B:
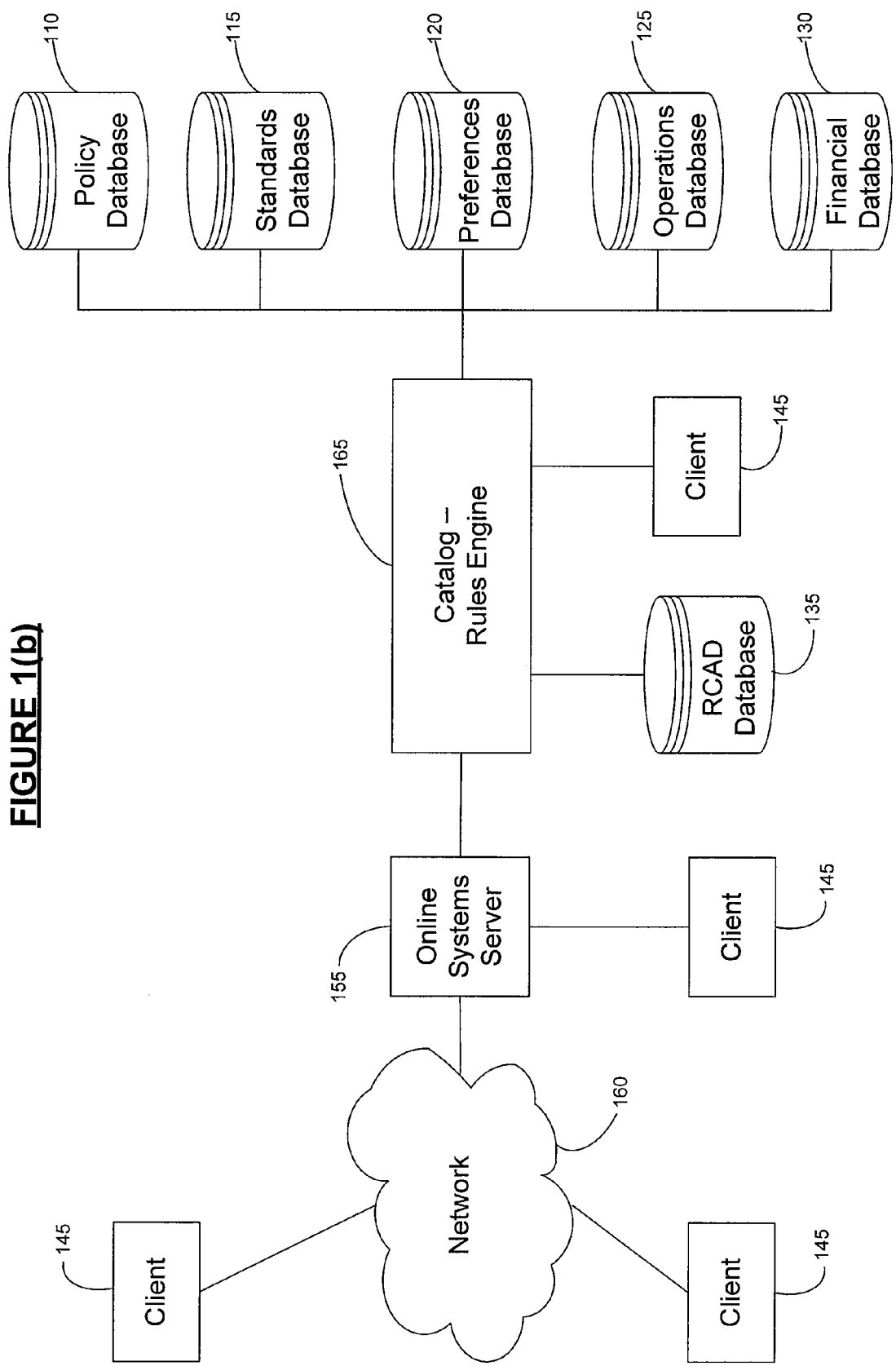

In a variation of the embodiment of FIG. 1(a), shown in FIG. 1(b), catalog 165 is an integration of both the catalog and the rules engine shown as separate elements in FIG. 1(a), and is connected to an online systems server 155, in order to make catalog 165 accessible from remote locations over a network 160, for example, the Internet. The term "remote location" is intended to include any access point outside the facilities of the organization. In this variation, rules engine is integrated into catalog 165 and is capable of being accessed from any of several client computers 145. Catalog 165 is also able to obtain information stored in the various databases 110-130 as described above, and is linked to RCAD database 135, as well.

FIG. 1(b) presents online systems server 155 in connection with catalog 165. Online server 155 may be any server known in the art, capable of supplying the information from any database linked to catalog 165, to client computers 145 over network 160, including as one possibility the Internet. The content of the information provided may be written and subsequently viewed in any conventional network language and/or graphics format including, but not limited to, HTML, Java Script®, XML and the like.

Information may be retrieved from online systems server 155 by client computer 145, which may be located at the facility of the organization. As illustrated in FIG. 1(b), information from catalog 165 may be accessed either directly through client computer 145 connected directly to the catalog, or over network 160 through online server 155 through client computer 145 connected thereto.

As with the embodiment of FIG. 1(a), client computers 145 are not limited to any particular form, and can be implemented as personal computers, workstations, terminals, etc.

Figure 1C:
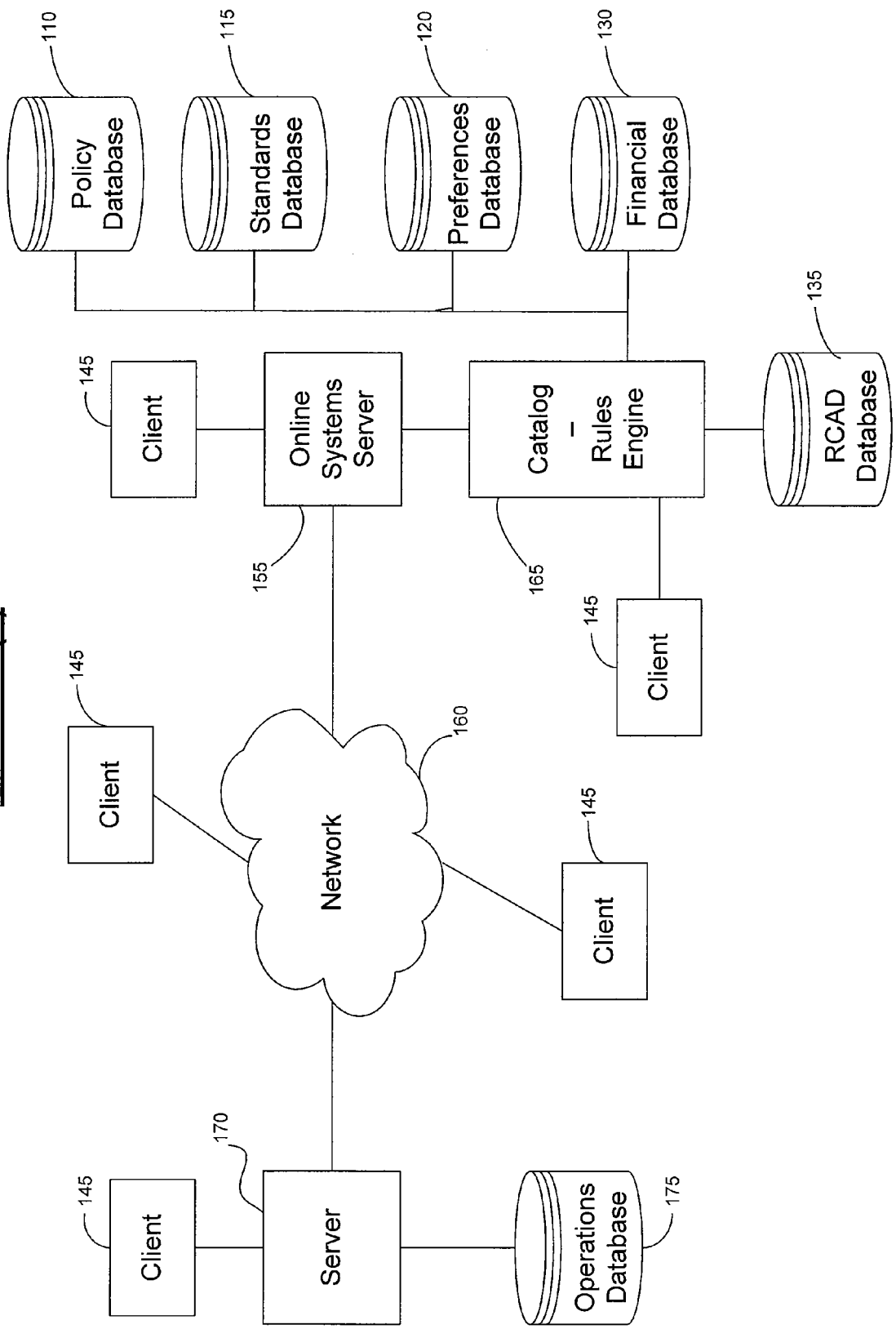

In another variation of the embodiment of FIG. 1(a), illustrated in FIG. 1(c), catalog 165 is in connection with online systems server 155 that allows information to be passed over network 160 to a separate server 170 such as, for example, one belonging to an outside vendor responsible for maintaining some aspect of the organization's operations. Thus, if a proposed new product or service will involve support by that vendor (for example, if the vendor maintains servers that will be needed for the proposed product or service), the operations data will be supplied by the vendor, over a network, for access by a user of the catalog. In FIG. 1(c), outside server 170 is associated with a separate database 175 storing operations data of the outside vendor. The information stored within database 175, which takes the place of the information in operations database 125 in the versions shown in FIGS. 1(a) and 1(b), may be updated, modified or deleted by the outside vendor, using a client computer 145 at the vendor's site.

The foregoing embodiments are merely illustrative of the possible implementations of the present invention and, accordingly, do not limit the present invention. Rather, alternate systems for implementation will be apparent to those of ordinary skill in the relevant art. In particularly, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any conventional programming or scripting language known in the art including as possibilities C, C++, Java, COBOL, assembler, PERL and XML, with the various algorithms being implemented with any combination of data structures, objects, processes, routines or other programming elements. Further, it should be noted that the present invention may employ any number of conventional techniques for data transmission, signaling, data processing, network control, encryption and the like.

In addition, the exemplary networks disclosed herein may include any system for exchanging data or transacting business, such as the Internet, an intranet, an extranet, WAN, LAN, satellite communications, and the like. It is noted that the network may be implemented as other types of networks, such as an interactive television network (ITN). Further still, the terms "Internet" or "network" include the Internet itself, any replacement, competitor or successor to the Internet, or any public or private inter-network, intranet or extranet based upon either open or proprietary protocols. Moreover, a variety of conventional communications media and protocols may be used for data links providing physical connections between the various system components. For example, the data links may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, the vendor may communicate with the system via a leased line, such as a T1, D3 line, or the like.

Figure 2A:
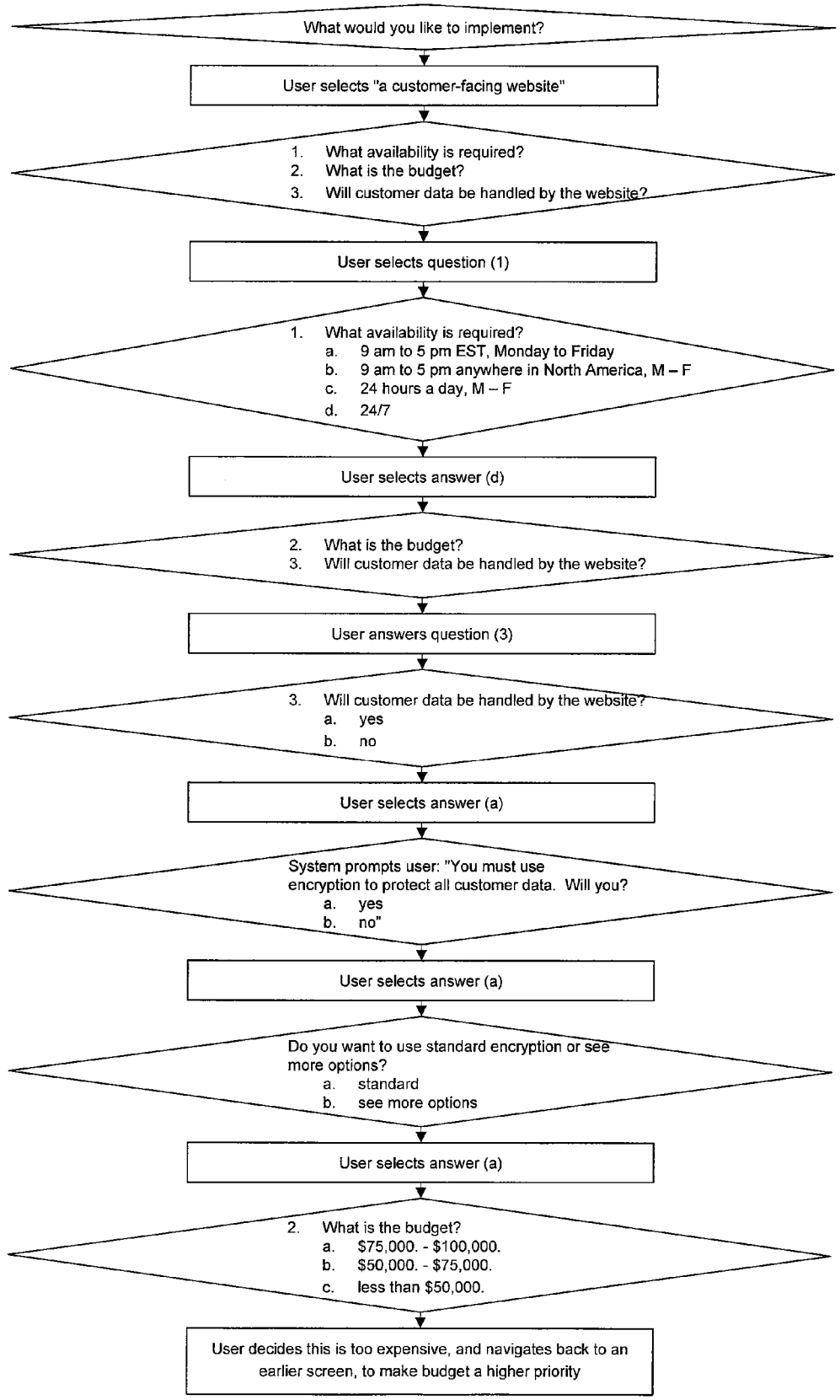
FIG. 2(a) illustrates an example a set of questions posed to the user.

Before the full description of the process of the invention, an example will be provided to illustrate what the system of the invention, in any of the three versions discussed above, achieves. The user, after logging on, is asked what kind of system or application they are trying to implement. This question, and those immediately following it, are not technical in nature but are more business focused. The questions may start with "What would you like to implement?" The possible answers may be listed as a menu, and may, by way of example, include: a customer-facing website, an internal intranet website, creation or expansion of a local-area network (LAN) or wide-area network (WAN), design of an application that will use data to be obtained from existing portions of the organization's infrastructure, database design or modification, and the like. Once the user answers the question, they will be prompted with more questions, based on the answer to the first question and on the rules in rules engine 140. If for example the user has entered "a customer-facing website" as the answer to the first question, these additional questions will seek more detail about the characteristics of the website, such as "What availability is required?", "What is the allocated budget for the project?", "Will customer data be handled by this website?", and so forth. If rules engine 140 determines that additional information is required from the user, based on any of the user's answers, rules engine 140 produces and presents questions to elicit such information. Rules engine 140 may also prompt the user on important points related to applicable RCAD, in the same way. For example, if the user's answer to the question "Will customer data be handled by this website?" is "yes", then rules engine 140 presents to the user a reminder that the organization's policies require that customer information be protected by encryption on any website that faces the customer. FIG. 2(a) illustrates a series of the user's responses to the questions.

After the user's response to the initial question, rules engine 140 or 165 may also present the user with several questions at once, for example, as a menu, to permit the user to decide freely which question to answer first. Rules engine 140 or 165 interprets the order in which these questions are answered as indicating the relative priority that the user assigns to the subject of the respective questions. For example, in the example shown in FIG. 2(a), the user has first answered the questions about website availability, indicating that this is a high priority, and only subsequently has answered the question about budget. As the user inputs their answers, rules engine 140 or 165 narrows down the range of architectures that would be consistent with the user's answers thus far. As a result, in FIG. 2(a), by the time the user has answered questions about availability, and sensitivity of data being handled, the answers that may be chosen as to budget allow only relatively high-cost choices: for example, "$75,000.-$100,000.", $50,000.-$75,000." and "less than $50,000.", conveying to the user that their previous answers mean that whichever architecture is ultimately selected, is going to be relatively expensive. If the user knows that a budget of up to $25,000. is realistic but that a higher one probably is not, the user may at this point navigate back to a previous screen, to assign the budget question a higher priority by answering it ahead of those relating to availability, etc. If the user's first concern is budget, on the other hand, they may begin by answering the budget question, and rules engine 140 or 165 will narrow the range of possible architectures to include only those that are consistent with the indicated budget. If at any point the user wishes to review a relevant policy, such as for example the policy relating to the protection of customer information on customer-facing websites, the policy document defining that policy, which is stored in policy database 110, can be accessed and viewed.

Figure 2B:
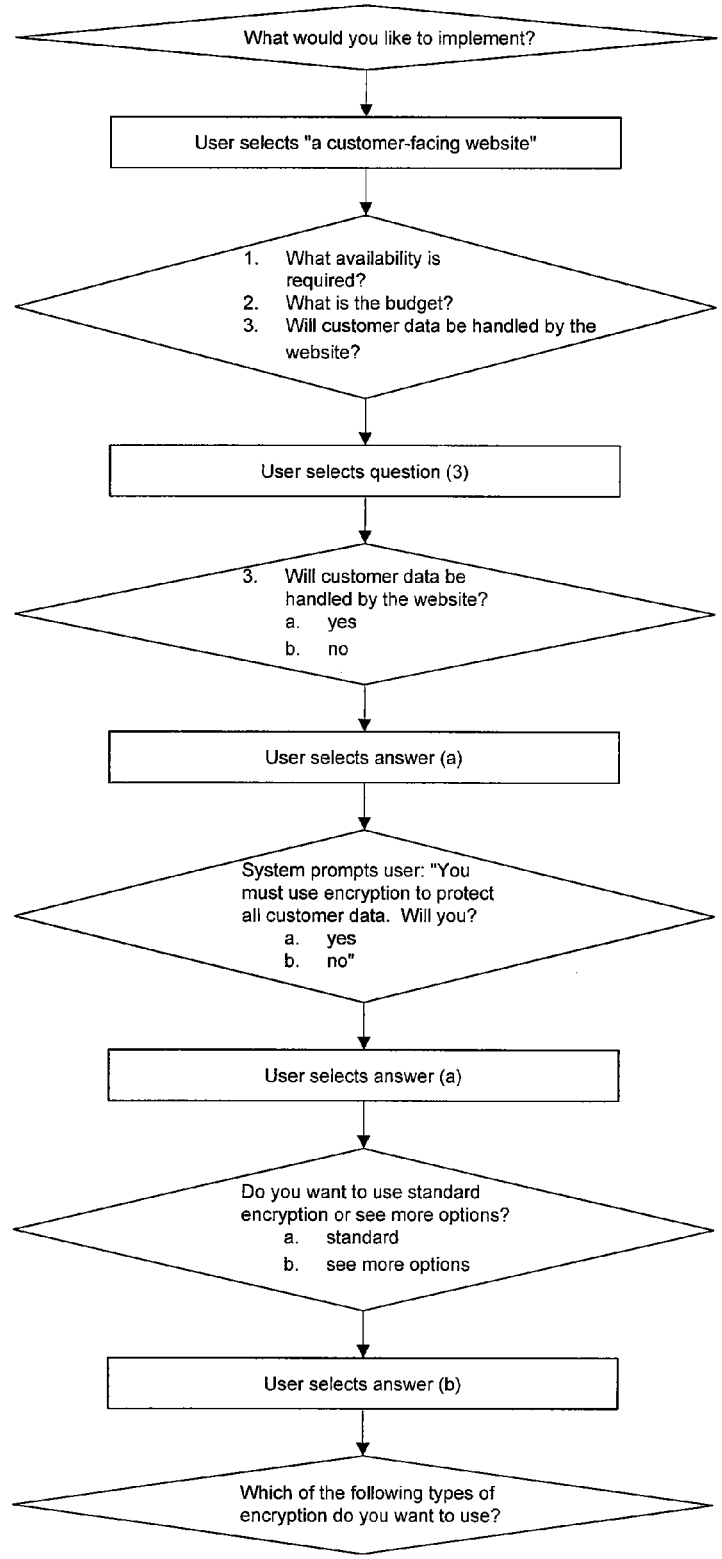
FIG. 2(b) illustrates an example in which the user optionally specifies certain technical details of the desired architecture.

The user also has great flexibility in the degree of detail they specify. For example, after inputting that the website will handle sensitive customer data, being prompted that encryption is required, and inputting a confirmation that such data will be encrypted, the user may, but need not, drill down to a level of greater detail regarding the encryption, and be presented with questions offering a choice of specific types or levels of encryption, or even a choice of specific algorithms. An example of a user specifying greater detail in this fashion is illustrated in FIG. 2(b).

Figure 3:
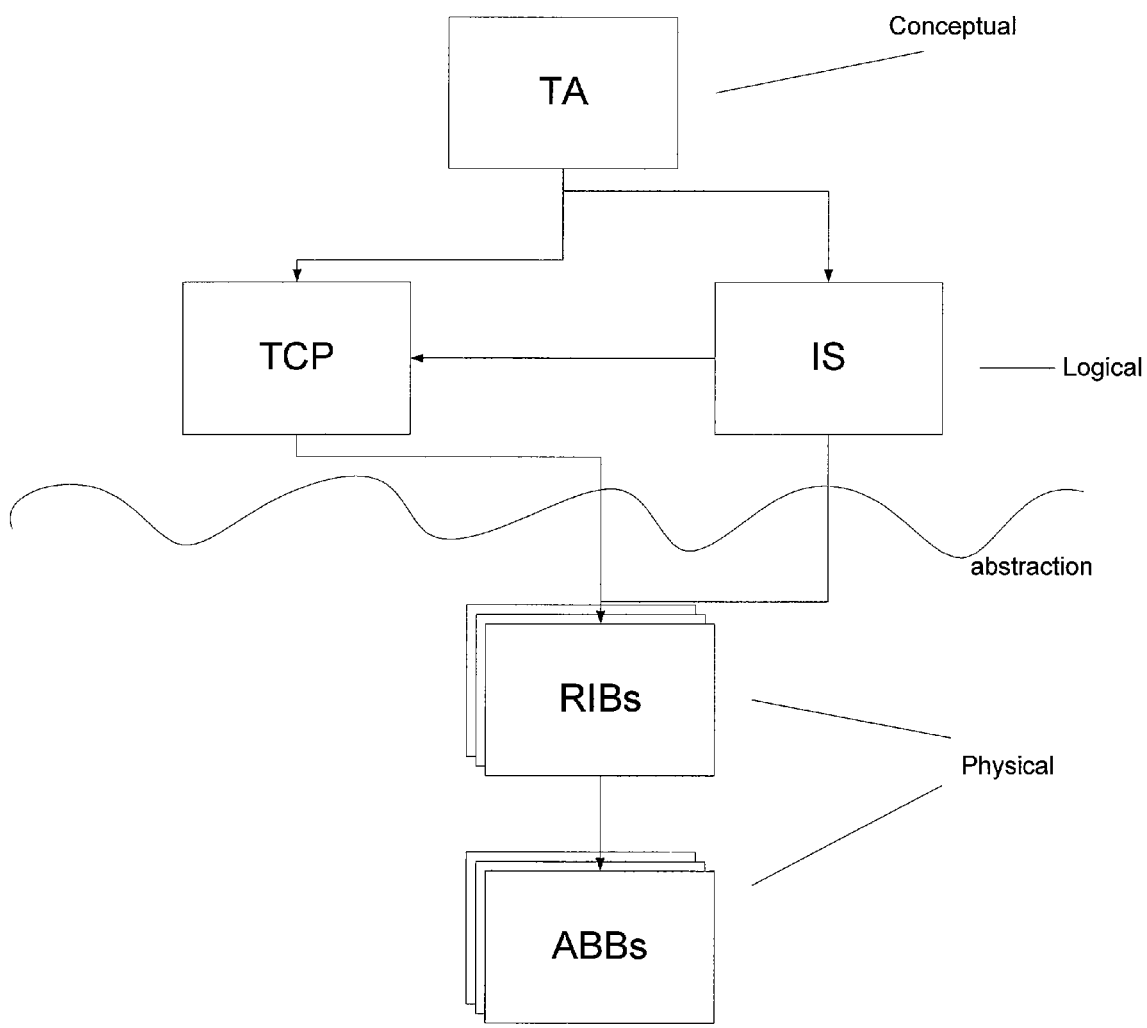
FIG. 3 is a diagram illustrating conceptually the information contained in the embodiments of FIGS. 1(a)-1(c).

System 100 gradually produces a set of one or more potential architectures. Elements that enter into the production of this set are illustrated, in a conceptual manner, in FIG. 3. In describing this Figure, the terms "Technical Architecture" (TA), "Technical Capability Patterns" (TCP), "Infrastructure Services" (IS), "Reference Implementation Blueprints" (RIB), and "Architecture Building Blocks" (ABB) will be used, and these terms are explained below.

A potential architecture includes a Technical Architecture (TA). The TA document describes holistically the architecture of a technical solution at a fairly high, or conceptual, level. The TA does not prescribe how systems are connected together or technical details of implementation, but describes end-to-end what the essential components, principles and policies are of the architecture. For each TA, there may be multiple TCPs. A TCP contains RCAD that, by defining the various requirements and so forth that must be met by the potential architecture, ultimately define what is to be done in the infrastructure. The TCP references an RIB, and the RIB in turn is an aggregation of ABBs. The ABB is the most granular infrastructure element, and contains everything required to fulfill a specific function. ABBs are combined to compose a RIB, which in turn defines an implementation—how things are built—as described in the TCP (the "what"). The RIB and ABBs can be viewed as the physical layer in the potential architecture.

Each element of the relevant RCAD (those in the TCP) has a corresponding reference or link to an element in the RIB or ABB. As explained above, the RCAD capture the institutional knowledge of what is to be done in the operational infrastructure, and are the prescriptions that drive the creation of the RIBs from the ABBs (and the ABBs themselves have been created based on the RCAD to begin with, so that the RCAD actually drive the design of the ABBs, and the assembling of the ABBs into a RIB). The IS and TCP, in contrast, are the logical layer of the potential architecture. The ISs define specific functions, and thus can be viewed as abstractions of the ABBs, in the case of the most basic functions, and the RIBs. The ISs serve as a virtual layer between the user and the details in the ABBs and RIBs. As an example, suppose that the user needs to encrypt data because there is a requirement for encryption in the TCP. The TCP would describe that this needs to be done, not how. The user can simply adopt the IS for encryption without knowing the underlying implementation details of where it is performed or how (as the user does in the example shown in FIG. 2(a)). The ABB for encryption would be responsible for the algorithm and the underlying key management, thus removing the burden of these details from the user. This allows specific algorithms, for example, to be swapped in and out by the relevant department of the organization (most often the IT department), provided the relevant interfaces are adhered to.

Alternatively, as described above with reference to FIG. 2(b), the user can if desired go deeper than the IS, and consider specific ways to perform the required encryption, considering various RIB that fit the requirements, or even specific ABBs.

Using the RCAD as the foundation of the RIB and ABB, therefore, not only saves the in-house development team time and effort, but also provides flexibility to the organization, in that the organization can easily outsource the creation of an application, without having to educate the vendor in all the organization's ways of doing things, since the vendor need only do its design work in compliance to the RCAD, knowing that if this is done, then the TCP will be adhered to, without the need for intimate knowledge of the underlying infrastructure.

III. Process

Figure 4:
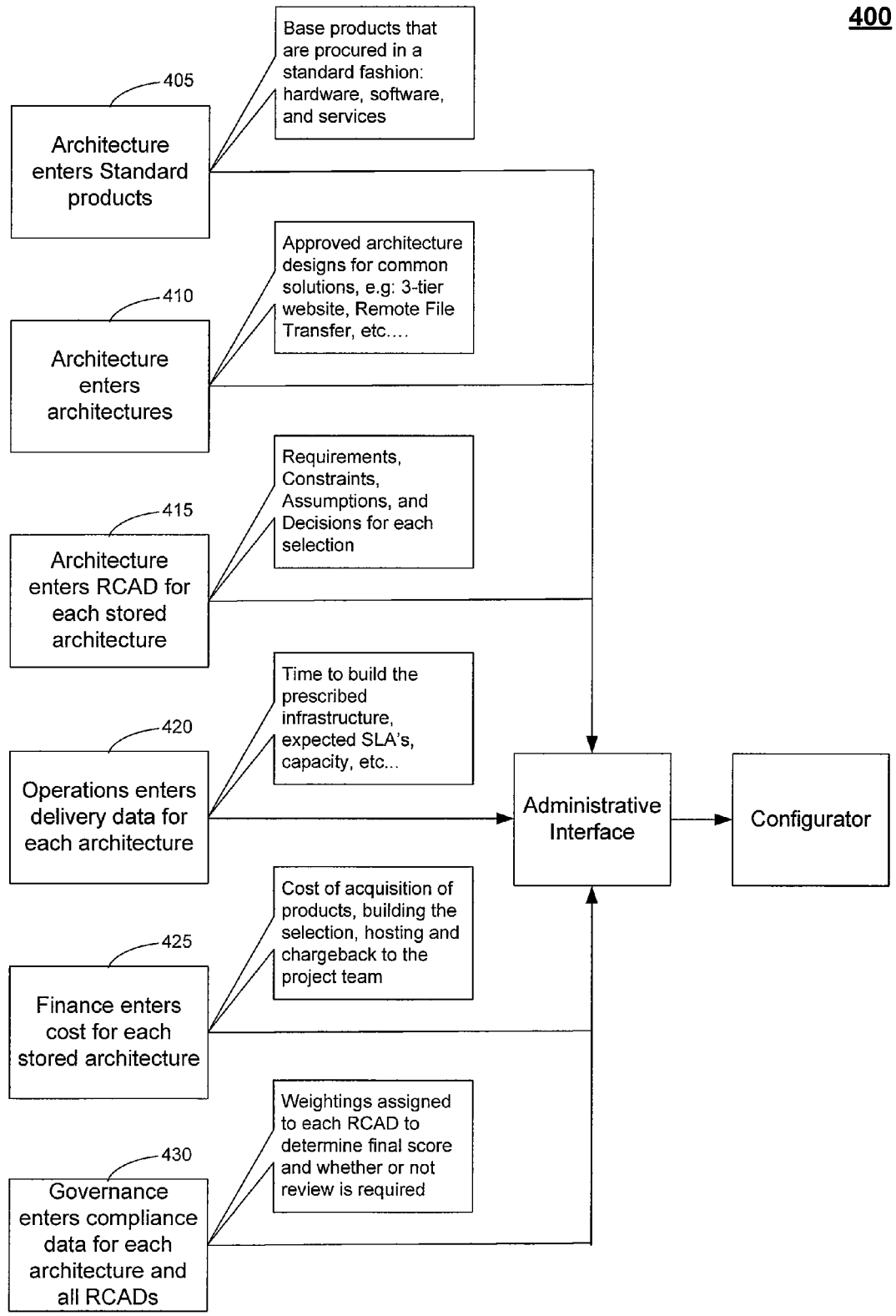
FIG. 4 is a chart outlining a process of constructing a reference architecture catalog system with informational components, in accordance with one embodiment of the present invention.

FIG. 4 is a chart outlining the process by which reference architecture catalog 105 or 165 is created, in accordance with one embodiment of the present invention. The catalog will contain an inventory of standard hardware and software systems or subsystems that are accepted by the organization for the performance of specific purposes (these are the ABBs). The catalog also will contain approved RIBs (implementation blueprints that have been accepted already), the corresponding ISs, and approved TCPs and TAs. Thus, catalog 105 or 165 is a complete supply of pieces that the user can select from to implement the project at hand, from entire architectures that are known to be acceptable (these may be referred to as "reference architectures"), to various acceptable basic systems (ABBs) and implementations (RIBs), and their functions per se (the ISs).

To start, a list of standard products, and information about them, are uploaded, via an administrative interface, onto the corresponding databases (step 405). Such products include those produced in a standard manner including but not limited to software and other provided services. Components are then entered into the system comprising approved architecture designs for common solutions (step 410). This may include, for instance, reference architectures for a three-tier website, Remote File Transfer, and the like. Next, the RCAD for each of the reference architectures are uploaded into RCAD database 135 (step 415). Preferably, this information is stored as XML documents (although other forms can be used if desired).

In addition, the operations personnel of an organization will upload delivery data for the various criteria aspects onto the system (step 420). Such data may comprise information relating to the time necessary to deliver a specific architecture, the labor resources that will be involved and what percentage of various personnel's time will be needed for such a project, and so forth.

Also, the finance personnel provide information regarding costs associated with particular architectures (step 425), including prices of specific components, hardware, software, and services. This information may include price figures for acquisition of products, building, hosting, and chargeback to the project team. The data relating to finance is likely to be updated frequently, as new costs are generated in the marketplace for the various hardware and software components that may be utilized as part of any proposed solution.

Data relating to governance or review of proposed solutions is likewise uploaded into the system (step 430). Specifically, compliance data is entered into RCAD database 135 for all of the requirements, constraints, assumptions and decisions stored on the system. In addition, particular weightings (i.e., point values) are assigned to each RCAD element for later determining whether manual review is warranted.

The above information is all input into the pertinent databases 110-135 and other components comprising reference architecture catalog system 100 for an organization as, for instance, the embodiment of the present invention illustrated in FIG. 1(a). Once reference architecture catalog system 100 has been populated with this data, the system is ready for use in accordance with the method described below.

Figure 5:
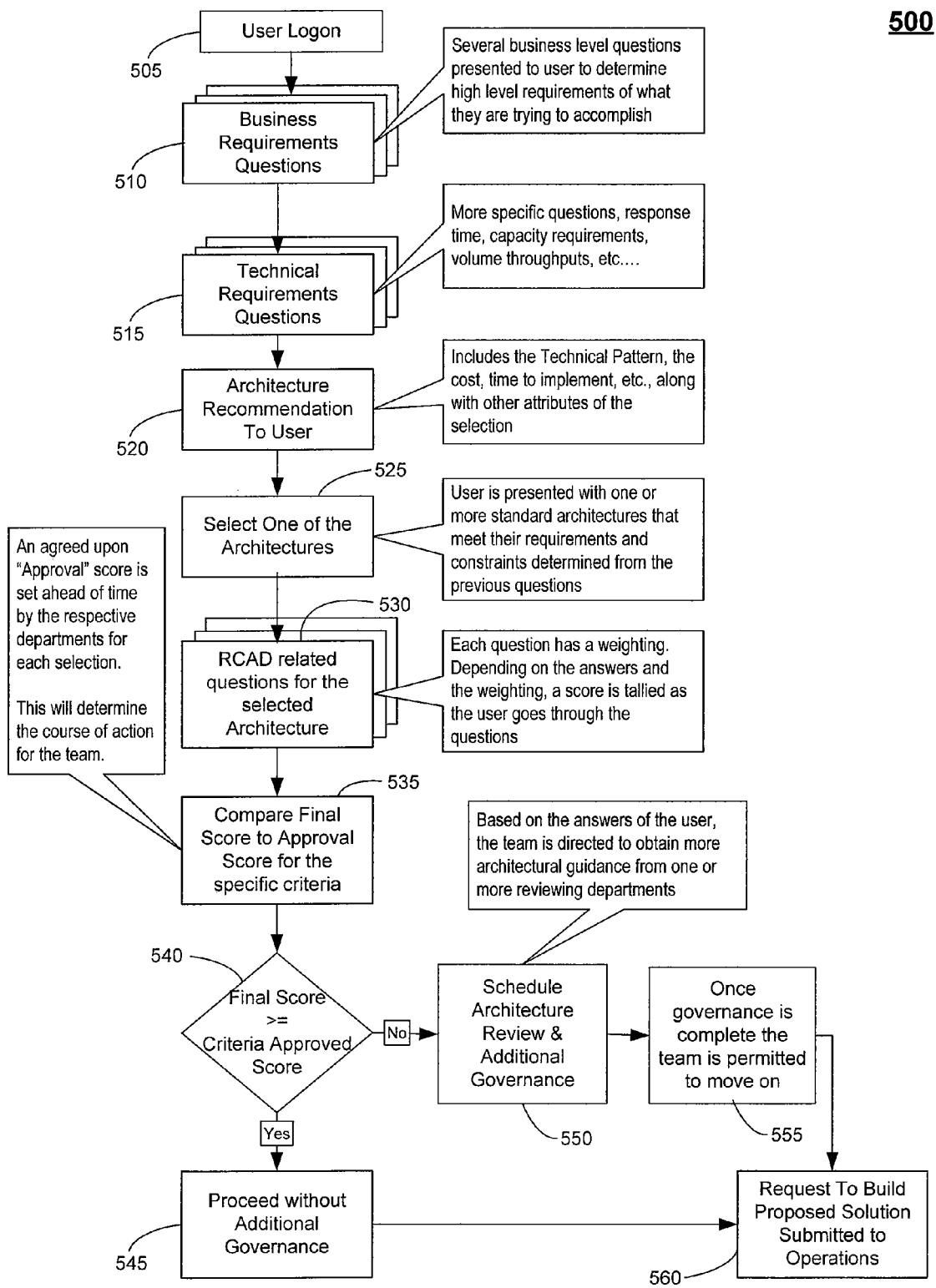
FIG. 5 is a flowchart illustrating a process for selecting a suitable architecture for implementing a proposed application, using a system in accordance with the present invention.

FIG. 5 is a flowchart illustrating a process for tailoring a new proposal to an organization's requirements and preferences, in accordance with one embodiment of the present invention. The process may begin with a user logging onto the catalog with a user identifier and password (step 505). The user may be a vendor or an employee of the organization, proposing a new application or business venture. An example of such a project may be designing an interactive website with new operating features for a company. Once the user has logged onto system 100, rules engine 140 or 165 presents the user with a first set of questions.

At this initial level, the user answers business-level questions about the nature and purpose of the project (intranet website, external website, virtual private network for a customer, etc.; in the case of an external website, hours of availability, etc.) (step 510). These questions permit rules engine 140 or 165 to begin the process of identifying an architecture for use in the project.

In step 515, the user answers additional questions directed to technical requirements to be met by the projected application, such as, in the case of a customer-facing website, response time, capacity requirements, and expected volume of use. As described above, the user is free simply to accept an existing way of performing a particular function, as in FIG. 2(a), or to drill down in catalog 105 or 165 to specify more exactly what is to be used.

Having narrowed the options at each level through the responses provided to each series of questions, system 100 presents the user with a set of architectures for implementing the project (step 520). At this point, the user selects one of the available architectures (step 525), and proceeds to a review of the selected architecture to be certain that it meets all relevant RCAD (step 530).

This review may begin with questions relating to policy-level RCAD, such as that all customer information, including names, addresses, telephone and Social Security numbers, must be protected during any transaction. Rules engine 140 or 165 can identify these RCAD easily because they are the RCAD linked to the TCP of the architecture. For every level, the review is conducted for all of the RCAD specified in the TCP selected by the user. That is, rules engine 140 or 165 uses the existing RCAD as the next level of questions presented to the user. Alternatively, however, it is within the scope of the present invention to present the questions in the review in any order.

In addition to the policy-related questions, the user may be presented with standards-, preferences- or financial-related questions, and if the services of a vendor will be used in the project, with operations-related ones as well.

The content of the following questions depends on the user's category selection. By way of example, it will be assumed that the user wishes to modify an existing site on which a customer of the organization can at present view their account balance and payment data, to make it possible for the customer also to view a record of individual purchases that have been charged to the account, and also to view data relating to a rewards account in which the customer accumulates redeemable reward points based on purchases the customer charges to the main account. The user therefore selects website creation or modification as the category. The succeeding questions elicit the information that a modification is proposed, as well as an identification of the website that is to be modified.

The process is now ready to move to step 515, and the user is asked for an estimate of the volume expected on the modified website, and whether there are changes in the required response time and availability of the site to customers. The user in our example inputs that the average volume of use per week is expected to double, but that at times of peak use, the modified site is expected to have to handle nearly triple the number of simultaneous users that can be accommodated by the existing site. The user also inputs that the existing two-second response time and 24/7 availability will apply to the modified site.

The user's answers to additional technical questions provide the information that the level and types of security are to remain the same, with the one exception that, in an account where plural cards have been issued, the account holder must have the ability to input the name(s) of the user(s) of the additional card(s), and that these additional person(s) is to be allowed to have access to the account information on the website that pertains to transactions performed with the card used by that individual, and that each such additional person must establish their own password. Thus, the website must provide dialog screens that enable the customer to designate such a second website user, if desired, and for an account whose holder has done so, the website must guide the second user, when they first log on to the site, through the process of establishing a password. Thereafter, of course, the site must be configured to permit the account holder to view all of the account and rewards-account information for that account, and to permit the second website user to be able to view the transactions performed using the second website user's card, upon one or the other user logging on and entering their respective password. (If, as a further illustration, the organization in question had a policy RCAD that prohibited allowing information of one account to be accessed via website by anyone other than the account holder, then that RCAD would be presented to the user of the system of the invention as a warning that the user should re-think the project to bring it into line with that RCAD, or else would need to obtain a review of the proposal by high-level management to obtain approval for a departure from organization policy.)

The user's answers are permanently stored to provide a record of the design process of this project.

Based on the information input by the user, a set of available architectures capable of supporting the modified website and handling the expected volume increases is identified to the user, in step 520. The user selects one of the architectures, in step 525. In our example the recommended architectures will likely include one that is the same as that actually used for the existing website, or a modification of that current architecture with additional servers to ensure the required volume capacity.

The process now moves to step 530, in which the selected architecture is examined to be sure that it fully complies with all applicable RCAD, those based on legal obligations, internal organization policy, established internal technical standards, organizational financial guidelines, etc. This can be done in a number of ways. In one approach, the user may be presented with each of the applicable RCAD on one portion of the screen, and asked to review the architecture on the rest of the screen, and to input a verification that the selected architecture meets the displayed RCAD. In so doing, the invention in effect seeks an acknowledgment from the user that they will in fact follow the prescribed architecture during implementation. The review thus memorializes the user's response as both a later audit point as well as a troubleshooting reference in the event that a different architecture is ultimately implemented.

Alternatively, the description of the architecture may contain sufficient information to permit system 100 itself to verify that at least certain ones of the RCAD are satisfied. For example, the RCAD may include a provision that a customer website must be physically able to handle twice the expected peak usage, and must be capable of being available 24/7 with 99.999% certainty (apart from problems occurring on the Internet itself or other conditions not within the organization's control). Based on the user's specified volume expectations, and the number and types of servers, and other relevant technical information, system 100 can itself determine whether the selected architecture will meet these two RCAD by comparing the user's response to the operations data.

In our example, the user has specified that the levels and types of security provided on the modified website are to be the same as those on the existing site. Suppose, however, that the organization has just decided that the encryption algorithm that has been the organization's preferred one, and which is used to protect the account and other confidential information in the existing website, should be replaced with a newer and still more secure algorithm. In the course of step 530, therefore, the user will learn that the encryption algorithm in the selected architecture does not meet the best practices for such algorithm in preferences database 120.

At this level the user may also be presented with additional questions and optional features, independent of the policy and standards branches continuing from the prior levels. These additional questions reflect features of the proposed application that are supplemental to the set of basic criteria codified in the policies and standards. To illustrate, the organization may have a requirement that any webpage must contain a blue background. Additional questions would then determine whether the user's proposal may be customized to operate according to this requirement of the organization's style guide.

Moreover, an additional option presented to the user may be whether the proposed website is to be operational on a 24-hour, 7-day-a-week basis, or during a smaller subset of that availability. Yet another question presented to the user may be whether the proposed website will support disaster recovery. As before, the particular options relating to different aspects of the proposal have a pre-determined score that is programmed according to the organization's preference for one architecture over another. These example preferences are provided as illustrations only, and are not intended to limit the invention to any particular questions presented at the preferences level.

Optionally, the user may proceed to a level of criteria regarding operations. Companies frequently contract with separate vendors to implement some aspect of pre-existing operations according to a specified schedule as perhaps ensuring its servers are operating on a 24-hour basis, with 99% reliability. In such cases, the outside vendor would likewise have its own internal policy and standards parameters for conducting these operations. Those parameters would then be conveyed to the organization, and subsequently presented to the user for determination of whether their new proposal also satisfies those architectures, in order to ensure compatibility of various applications. Examples of operation standards may include where an application is installed, whether more than one application may share a particular server, how much memory is required, and the like.

The user continues down the decision process to the next level, with questions representing the organization's financial considerations (not shown). A question at this level, for instance, may ask the user for the anticipated cost for implementing and supporting the proposal with answer choices delineating several price ranges. As before, the particular cost ranges making up the answer choices each have a pre-assigned score based on the preferred spending of or amount allocated by the organization. Any projected costs the user may input that are higher than the organization's prescribed levels would be flagged for later review by the appropriate personnel. Importantly, it should be noted that such financial criteria may alternatively be among the policy level criteria (e.g., step 510).

For every answer provided by the user, rules engine 140 or 165 maintains a preset point value of the options available. The point value corresponds to a predefined scale indicating by how much a given answer choice deviates from the preferred series of parameters. To illustrate, if, for example, a company's policy is that all customer information must be protected, there may be a simple preset value of 1 for the answer choice that the new application is able to accomplish this requirement, and a value of 0 if it is unable to do so. Rules engine 140 or 165 then compares the point value associated with the answer selected by the user with the approved score as set by the organization. An answer that closely correlates with the preset score of the organization indicates that the particular aspect of the proposal under consideration satisfies the requirement and thus presents a standard solution. Conversely, the resulting score of a selected answer that diverges significantly from the preferred score indicates a non-standard proposal, thereby alerting the organization to a greater potential for risk.

Any non-standard response is assigned a specific score reflecting its deviation and electronically flagged by rules engine 140 or 165 as requiring additional governance. By virtue of this process, the present invention allows the various departments of any organization to focus their oversight efforts on proposals that do not conform to the organization's preferred architectures, in order to securitize such proposals especially carefully. By relieving a company of the need to review every aspect of each new proposal manually, the present invention enables the organization to concentrate on oversight of the proposed solutions (or any security, operational, legal or other dimension thereof, depending on where the deviation took place) that ultimately present the greatest risks.

The user continues with the review, and at the end, a final score is computed. Then, after completing all levels of questioning, the user is presented with the final score, along with information on how that score compares with the accepted parameters of the organization. In addition, the user is presented with an estimated cost for implementing and maintaining the proposal, time to implement, and so forth. With this information, the user may optionally return to any one of their previous selections made in steps 510 and 515, answer choices to modify their selection if, for instance, the total estimated price of the proposal is too high based on the previously selected options. In this way, the present invention enables the user to revise responses to better tailor their proposal to the approved, standard parameters and architectures of the organization. With this feature, also, the organization can entertain different proposals from competing parties and select the proposal that best satisfies the organization's criteria.

At the same time, upon conclusion of the decision process by the user, the organization is provided with a record of these responses for each question at every level, so that it is clear who decided on each deviation from the norm, and facilitating auditing.

Moreover, low scores from user responses for each separate level may be transmitted to the appropriate department or team within the organization, so that for example, any non-standard response for security protocols is addressed by the technology department while an excessive cost is relayed to the financial managers for their respective review. Accordingly, the present invention reduces the time for final authorization of any non-standard proposals by directing non-compliant solutions to the personnel or department best suited to conduct an in-depth review so as to altogether avoid repetitive oversight.

The user's final score is compared to a preset approved score established in advance based on the collective information from the various departments and teams at an organization (step 535). If the user's final score is greater than or equal to the preset approved score (step 540), the user's proposed implementation may proceed without any additional governance (step 545). Hence, a request to build the proposed solution is submitted to operations (step 560). Alternatively, if the user's final score is below the preset approved score, additional governance is scheduled for the proposed implementation, along with an architecture review by the various departments to address possible alternatives for particular non-conforming aspects (step 550). Once the additional review is completed satisfactorily (step 555), the solution, modified in any way mandated by the additional review, may be submitted for implementation (step 560). Thus, the present invention ensures that the critical parameters of the organization are met, while at the same time, the user is left with a sufficient range of operability in which to implement the new features of their proposals.

The consequences of a feature in the selected architecture not conforming to one or another RCAD can vary according to the RCAD. For each RCAD that is conformed to, the selected architecture is awarded one or more points, the number of points depending on the relative importance of the respective RCAD. For example, the selection of the preferred encryption algorithm might be worth two points, but the use of an older, but nonetheless good, encryption algorithm might still give the selected architecture one point, while use of an algorithm deemed insufficiently secure or too slow, might result in zero points on this RCAD.

Similarly, various numbers of points might be awarded with respect to other RCAD depending on whether the selected architecture is acceptable, above average or superior. For example, for a particular type of project, if the cost of implementation is between $25,000 and $30,000, the architecture may be awarded one point, while two are given for a cost between $15,000 and $25,000, and three for a cost below $15,000.

In step 540, the final score is compared to a threshold value (the "TCP Approved Score" in FIG. 5) which the final score is required to equal or exceed for the selected architecture to be approved without further review. If that requirement is met, the selected architecture does not require any further approval, and the user may proceed with the project.

If the final score is too low, the user is informed that further review is required, and the user meets with personnel from one or more departments to review the selected architecture and modify it if those personnel do not determine that the architecture is acceptable in its present form.

In one embodiment, the fact that a user has selected an architecture that has not equaled or exceeded the required TCP Approved Score is communicated automatically to the departments that will be involved in subsequent review.

It is also within the scope of the invention to use a maximum permitted score, rather than a minimum, as the threshold in step 535. This is done by adding one or more points to the architecture's score for each RCAD that the architecture does not meet.

Another variation that is also within the scope of the invention is to keep track, during step 530, not only of the total score of the selected architecture, but also maintain a list of which RCAD have not been met. If the determination in step 540 requires further review for the architecture, then system 100 notifies each department from which the RCAD in question originated, or gives a list of the relevant departments to the user, or does both. This determination can be made simply on the basis of which of databases 110-130 contains the RCAD in question, or in any other fashion that is deemed convenient.

Again, certain RCAD may be indicated in databases 110-130 as being critical ones that must be met without exception. If any of these RCAD is among those not met, the user must obtain further review from the portion of the organization from which that RCAD originated.

The present invention is not limited to the question framework outlined above, but instead may accommodate different sets of questions at different levels. The levels are intended only as a hierarchical structure for narrowing a subset of the available architectures for implementing a new proposal, and are not meant to limit the invention to the particular question content at or sequence of each level herein described. Further, different criteria may appear as questions at different levels, depending on the individualized needs of any business or company. For instance, costs may instead be presented to a user as a top-level policy consideration, such as when a given business will not authorize any new application that exceeds an operating budget of a half-million dollars. The present invention thus allows different organizations to uniquely structure their preferred requirements and architectures for presentation to all potential users.

Figure 6:
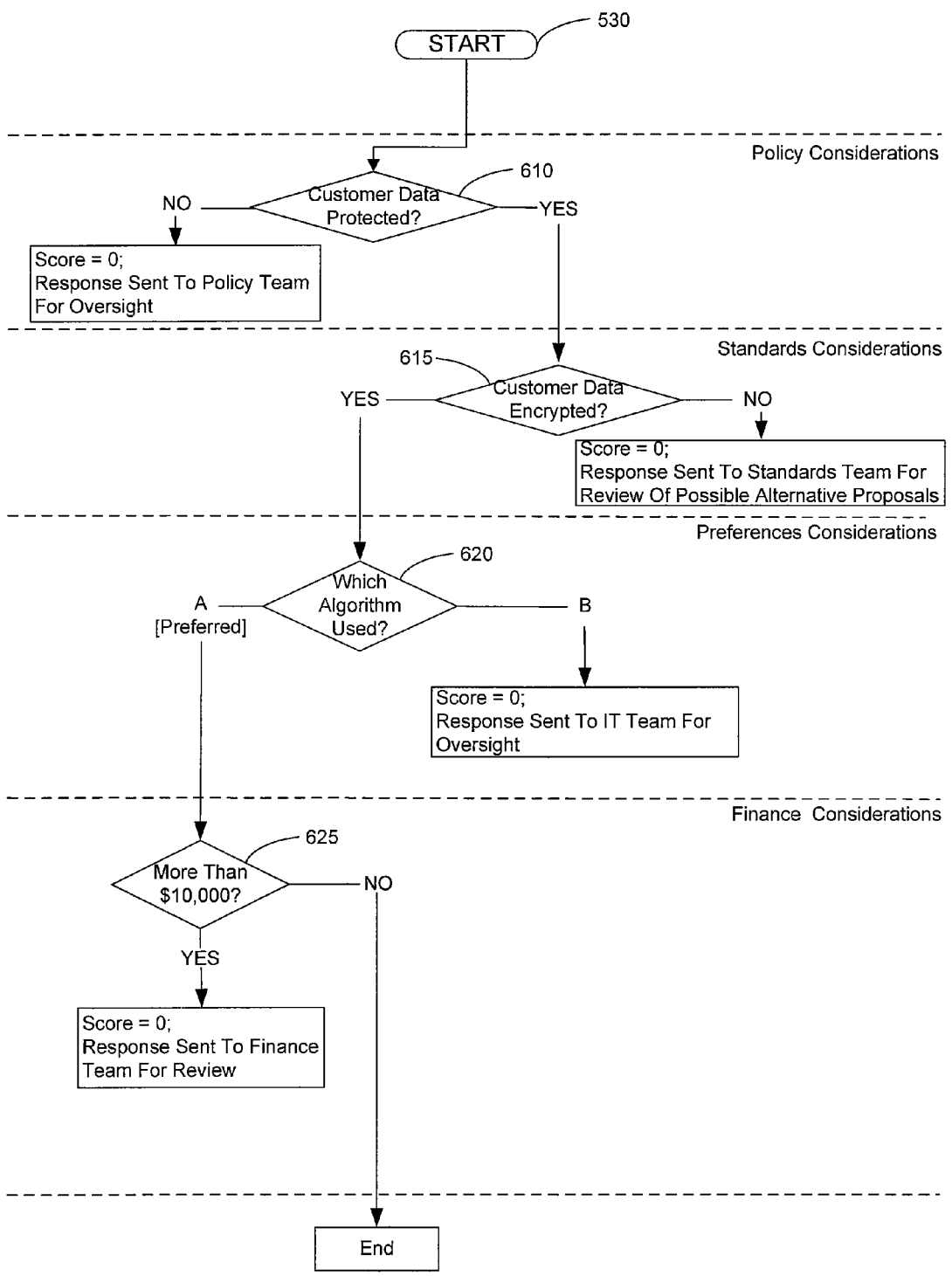
FIG. 6 is a flowchart illustrating an exemplary operation of a reference architecture catalog system by a user to arrive at a suitable architecture for implementing a proposed website, in accordance with one embodiment of the present invention.

FIG. 6 shows an illustration of part of a review of a selected architecture. The user answers a series of questions relating to the RCAD that apply to the selected architecture.

In this illustration, each screen presents the user with a different question. For instance, the first screen may show a policy question on whether customer data will be protected on a proposed website (step 610). If the answer is affirmative (what it should be), the architecture's score is incremented by one, while if the answer is negative, the score is not changed. Assuming that the response to the first question was affirmative, then in the next screen, the user may be asked whether the data will be encrypted (step 615). Again, the score is incremented if the answer indicates compliance with the RCAD in question, and otherwise, the score is unchanged. Assuming the answer to the second question is yes, however, the user is asked which encryption algorithm is to be employed (step 620). If the response is the algorithm that the organization considers the preferred one, the score is again incremented, while otherwise the score is not changed. In another screen the user may be asked whether the cost of implementation will exceed $10,000. (step 625), with the "wrong" answer resulting in no incrementing of the score, and an alert being sent to request a review by the finance department.

Based on the total score indicating particular deviations at each RCAD above, an alert is, if appropriate, generated once the review is completed. As an alternative also within the broad scope of the invention, an alert may be generated each time in the review the user's response indicates that an RCAD is not being met. Such running alerts are a less-preferred approach because the user after entering a response indicating a departure from the RCAD may reconsider the selected architecture, and ultimately may select another architecture from among those proffered by the system, or may navigate back in the catalog to obtain a new set of potential architectures, in which case some or all of the running alerts may have been unnecessary. Also, instead of separate alerts being issued to several departments, the system may simply advise the user that the project cannot be approved without further review, leaving it to the user to arrange the necessary review.

IV. Example Implementations

The present invention (i.e., system 100, process 500, or any part(s) or function(s) thereof) may be implemented using hardware, software or a combination thereof and may be implemented in one or more computer systems or other processing systems. Useful machines for performing the operation of the present invention include general purpose digital computers or similar devices.

Figure 7:
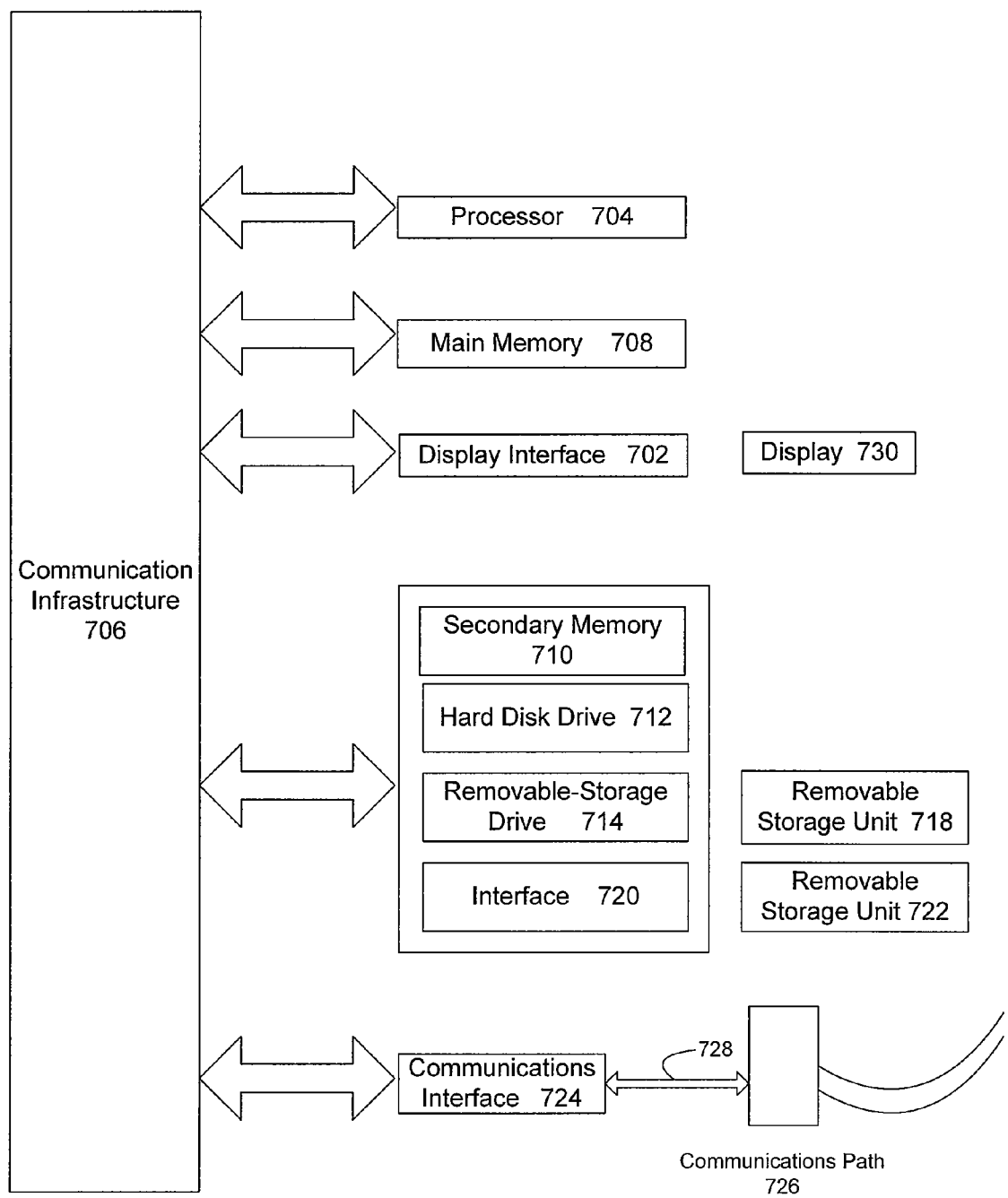
FIG. 7 is a block diagram of an exemplary computer system useful for implementing the present invention.

In fact, in one embodiment, the invention is directed toward one or more computer systems capable of carrying out the functionality described herein. An example of a computer system 700 is shown in FIG. 7

The computer system 700 includes one or more processors, such as processor 704. The processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 702 that forwards graphics, text, and other data from the communication infrastructure 706 (or from a frame buffer not shown) for display on the display unit 730.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well-known manner. Removable storage unit 718 represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 714, a hard disk installed in hard disk drive 712, and signals 728. These computer program products provide software to computer system 700. The invention is directed to such computer program products.

Computer programs (also referred to as computer control logic) are stored in main memory 708 and/or secondary memory 710. Computer programs may also be received via communications interface 724. Such computer programs, when executed, enable the computer system 700 to perform the features of the present invention, as discussed herein. In particular, the computer programs, when executed, enable the processor 704 to perform the features of the present invention. Accordingly, such computer programs represent controllers of the computer system 700.

In an embodiment where the invention is implemented using software, the software may be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

The invention claimed is:

1. A computer-implemented method for identifying a software-system architecture that is suitable for a project for an organization, said method comprising the steps of:
   a) receiving from a user interface plural criteria that must be met by the software-system architecture that the user is designing, and storing the plural criteria in a database;
   b) processing the criteria using a rules engine to determine a set of at least one potential architecture that meets the criteria, wherein the at least one potential architecture includes a plurality of software-architecture components;
   c) receiving from the user interface a user instruction accepting a project architecture from the set of at least one potential architecture;
   d) evaluating whether the project architecture meets a plurality of requirements imposed by the organization, and assigning a score to the project architecture, based on the evaluation;
   e) comparing the assigned score to a predefined score that defines a level of conformity to the requirements such that the user is authorized to adopt the project architecture for the project without farther management oversight; and
   f) providing to the user interface an identifier of the project architecture and an indication of whether the project architecture is suitable for the project based on the comparison of the assigned score to the predefined score.

2. The method of claim 1, wherein said step a) of receiving the criteria from the user interface further comprises the sub-steps of
   a-1) posing a question to the user about the project;
   a-2) selecting a further question and posing the further question to the user, the selecting being performed using the rules engine, and being based on the user's response to the question; and
   a-3) iterating the selecting and posing of further questions.

3. The method of claim 2, further comprising the step of using the user interface to display to the user an interactive catalog of software-architecture components and systems such that the user is able using the interface to drill down in the catalog to obtain additional detail about a particular system in the catalog.

4. The method of claim 1, wherein said evaluating step further comprises the sub-step of assigning, for each requirement, a point value that represents the degree to which the project architecture meets that requirement, and weighting the point values corresponding to respective requirements so as to give heavier weight to adherence to any of the requirements that the organization has designated as being more important than others of the requirements.

5. The method of claim 1, wherein respective requirements represent respective organization policies, standards, preferences, and finance considerations.

6. The method of claim 5, wherein respective requirements also represent respective policies, standards, preferences, and finance considerations of a vendor, relating to services provided to the organization by that vendor.

7. The method of claim 1, further comprising the step of g) iterating said steps a)-f), and wherein, in each iteration, said step d) of evaluating includes updating the assigned score obtained in the previous performance of said step d), and wherein, in each iteration, said step e) of comparing includes comparing with the predefined score, the assigned score as changed in the most recent iteration of said step d).

8. The method of claim 1, wherein the rules engine operates using rules based on the requirements, and the requirements represent at least one of technical, legal, financial and policy considerations.

9. A computer system for identifying a software-system architecture that is suitable for a project for an organization, by selecting from a catalog of a plurality of components for at least one architecture, said computer system comprising:
   a) a user interface communicatively coupled to a database, for inputting plural criteria that must be met by the software-system architecture that the user is designing, and for storing the plural criteria;
   b) a rules engine that processes the criteria to determine a set of at least one potential architecture that meets the criteria, wherein the at least one potential architecture includes a plurality of software-architecture components, wherein said user interface is also constructed to permit the user to input an instruction accepting a project architecture from the set of at least one potential architecture; said rules engine applying rules to evaluate whether the project architecture meets a plurality of requirements imposed by the organization, and assigning a score to the project architecture, based on the evaluation; and
   c) a processor, said processor comparing the assigned score to a predefined score that defines a level of conformity to the requirements such that the user is authorized to adopt the project architecture for the project without farther management oversight, and said processor providing to said user interface an identifier of the project architecture and an indication of whether the project architecture is suitable for the project based on the comparison of the assigned score to the predefined score.

10. The system of claim 9, wherein said rules engine causes said user interface to:
   1) pose a question to the user about the project;
   2) select a farther question and pose the farther question to the user, the selecting being based on the user's response to the question; and
   3) iterate the selecting and posing of further questions.

11. The system of claim 10, wherein said user interface displays to the user an interactive catalog of software-architecture components and systems such that the user is able using the interface to drill down in the catalog to obtain additional detail about a particular system in the catalog.

12. The system of claim 9, wherein, as part of the evaluation, said rules engine assigns, for each requirement, a point value that represents the degree to which the project architecture meets that requirement, and weights the point values corresponding to respective requirements so as to give heavier weight to adherence to any of the requirements that the organization has designated as being more important than others of the requirements.

13. The system of claim 9, wherein respective requirements represent respective organization policies, standards, preferences, and finance considerations 14. The system of claim 13, wherein respective requirements also represent respective policies, standards, preferences, and finance considerations of a vendor, relating to services provided to the organization by that vendor.

15. The system of claim 9, further comprising the step of g) iterating said steps a)-f), and wherein, in each iteration, said step d) of evaluating includes updating the assigned score obtained in the previous performance of said step d), and wherein, in each iteration, said step e) of comparing includes comparing with the predefined score, the assigned score as changed in the most recent iteration of said step d).

16. The system of claim 9, wherein said rules engine operates using rules based on the requirements, and the requirements represent at least one of technical, legal, finance and policy considerations.

17. A computer program product comprising a computer usable medium having control logic stored therein for causing a computer to identify a software-system architecture that is suitable for a project for an organization, said control logic comprising:
   a) first computer readable program code for causing the computer to receive from a user interface plural criteria that must be met by the software-system architecture that the user is designing, and for causing the computer to store the plural criteria in a database;
   b) second computer readable program code for causing the computer to process the criteria using a rules engine to determine a set of at least one potential architecture that meets the criteria, wherein the at least one potential architecture includes a plurality of software-architecture components;
   c) third computer readable program code for causing the computer to receive from the user interface a user instruction accepting a project architecture from the set of at least one potential architecture;
   d) fourth computer readable program code for causing the computer to evaluate whether the project architecture meets a plurality of requirements imposed by the organization, and assigning a score to the project architecture, based on the evaluation;
   e) fifth computer readable program code for causing the computer to compare the assigned score to a predefined score that defines a level of conformity to the requirements such that the user is authorized to adopt the project architecture for the project without farther management oversight; and
   f) sixth computer readable program code for causing the computer to provide to the user interface an identifier of the project architecture and an indication of whether the project architecture is suitable for the project based on the comparison of the assigned score to the predefined score.

18. The computer program product of claim 17, wherein said first computer readable program code further comprises computer readable program code for causing the computer to:
   a-1) pose a question to the user about the project;
   a-2) select a further question and pose the further question to the user, the selecting being performed using the rules engine, and being based on the user's response to the question; and
   a-3) iterate the selecting and posing of further questions.

19. The computer program product of claim 18, further comprising the step of using the user interface to display to the user an interactive catalog of software-architecture components and systems such that the user is able using the interface to drill down in the catalog to obtain additional detail about a particular system in the catalog.

20. The computer program product of claim 17, wherein said fourth computer readable program code further comprises computer readable program code for causing the computer to assign, for each requirement, a point value that represents the degree to which the project architecture meets that requirement, and to weight the point values corresponding to respective requirements so as to give heavier weight to adherence to any of the requirements that the organization has designated as being more important than others of the requirements.

21. The computer program product of claim 17, wherein respective requirements represent respective organization policies, standards, preferences, and finance considerations.

22. The computer program product of claim 20, wherein respective requirements also represent respective policies, standards, preferences, and finance considerations of a vendor, relating to services provided to the organization by that vendor.

23. The computer program product of claim 17, further comprising g) seventh computer readable program code for causing the computer to iterate execution of said first through sixth computer readable program code, and wherein, in each iteration, execution of said fourth computer readable program code causes the computer to update the assigned score obtained in the previous performance, and wherein, in each iteration, execution of said fifth computer readable program code causes the computer to compare with the predefined score, the assigned score as changed in the most recent iteration of execution of said fourth computer readable program code.

24. The computer program product of claim 17, wherein the rules engine operates using rules based on the requirements, and the requirements represent at least one of technical, legal, finance and policy considerations.

* * * * *